3,018,283
NEW OXYGENATED DERIVATIVES OF STEROIDS AND PROCESS OF THEIR PREPARATION
Georges Muller, Nogent-sur-Marne, and André Poittevin, Les Lilas, France, assignors to Les Laboratoires Francais de Chimiotherapie, Paris, France, a corporation of France
No Drawing. Filed July 6, 1961, Ser. No. 122,086
Claims priority, application France July 29, 1960
3 Claims. (Cl. 260—239.55)

This invention relates to new 18-oxygenated steroids and, more particularly, to 16α-methyl-11β,18-oxido-Δ⁴-pregnene-3,20-dione (16α-methyl-11β,18-oxido-progesterone) of the Formula I

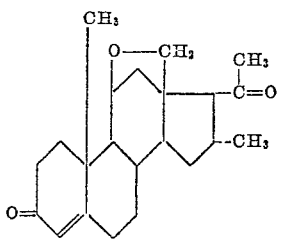

as well as to the process of preparing this compound and its intermediates.

16α-methyl-11β,18-oxido-Δ⁴-pregnene-3,20-dione, I, has a melting point of 190° C. and a specific rotation $[\alpha]_D^{20} = +200° \pm 10°$ (c.=0.25% in chloroform), and is very soluble in alcohol and chloroform, soluble in acetone and ether, and insoluble in water. This novel compound, I, has interesting pharmacological properties. In particular, it has an antialdosteronic activity.

It is an object of this invention to obtain 18-oxygenated steroids and, more particularly, 16α-methyl-11β,18-oxido-Δ⁴-pregnene-3,20-dione (16α-methyl-11β,18-oxido-progesterone).

It is a further object to provide a process for the production of 16α-methyl-11β,18-oxido-Δ⁴-pregnene-3,20-dione.

It is another object of the invention to obtain as novel intermediates:

16α-methyl-18,20β-oxido-5β-pregnane-3α,11β-diol;
16α-methyl-18,20β-oxido-5β-pregnane-11β-ol-3-one;
16α-methyl-20β-formyloxy-11β,18-oxido-5β-pregnane-3-one;
4-ξ-bromo-16α-methyl-20β-formyloxy-11β,18-oxido-5β-pregnane-3-one;
16α-methyl-20β-formyloxy-11β,18-oxido-Δ⁴-pregnene-3-one, and
16α-methyl-11β,18-oxido-Δ⁴-pregnene-20β-ol-3-one.

These and other objects of the invention will become more apparent as the description thereof proceeds.

The process of the invention comprises producing 16α-methyl-11β,18-oxido-Δ⁴-pregnene-3,20-dione by the following reaction steps.

16α-methyl-3α-acetoxy-18,20β-oxido-5β-pregnane-11-one, II, is reduced in the 11 position, accompanied simultaneously by a saponification of the acetoxy group in the 3 position to give 16α-methyl-18,20β-oxido-5β-pregnane-3α,11β-diol, III. This latter compound is selectively oxidized on the hydroxy group in the 3 position which furnishes 16α-methyl-18,20β-oxido-5β-pregnane-11β-ol-3-one, IV. A transposition of the oxido bridge in the 18,20β position of Compound IV into the 11β,18 position with esterification of the hydroxyl group in the 20β position thus freed is effected by action of an organic carboxylic acid, this furnishes 16α-methyl-20β-formyloxy-11β,18-oxido-5β-pregnane-3-one, V, when the acid is formic acid. By bromination in the 4 position of 16α-methyl-20β-formyloxy-11β,18-oxido-5β-pregnane-3-one (V) followed by dehydrobromination of the 4ξ-bromo-16α-methyl-20β-formyloxy-11β,18-oxido-5β-pregnane-3-one (VI) so obtained, 16α-methyl-20β-formyloxy-11β,18-oxido-Δ⁴-pregnene-3-one (VII) is produced. This latter compound is saponified into 16α-methyl-11β,18-oxido-Δ⁴-pregnene-20β-ol-3-one (VIII) whose hydroxyl in the 20 position is next selectively oxidized to give the desired 16α-methyl-11β,18-oxido-Δ⁴-pregnene-3,20-dione (I).

Table I is a schematic flow diagram of the process of the invention.

TABLE I

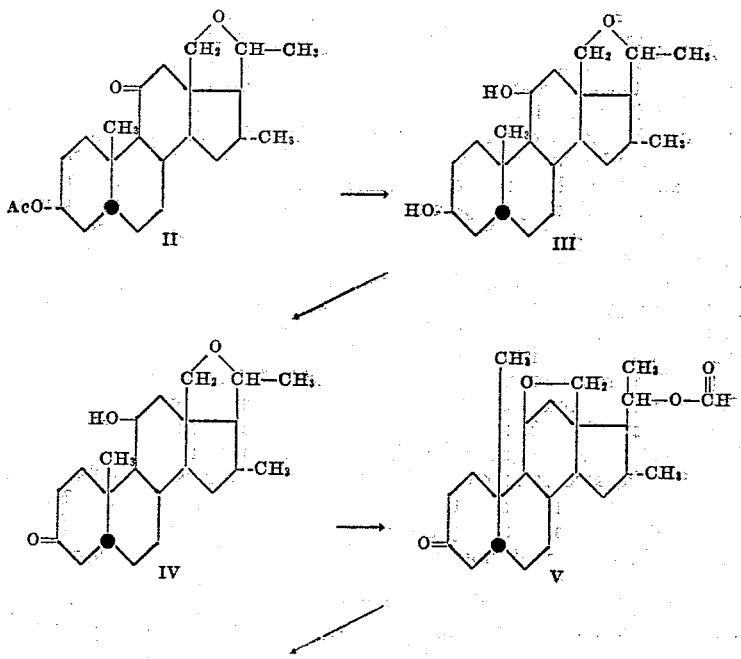

TABLE I—Continued

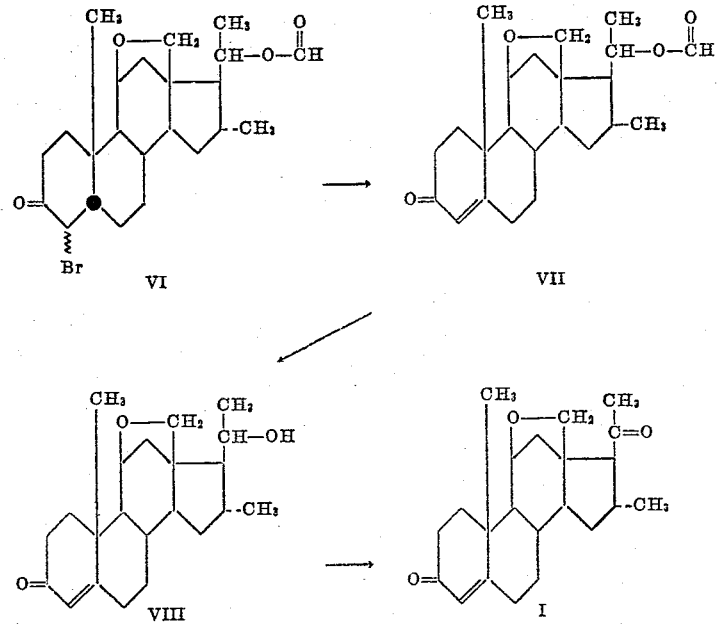

The starting compound, 16α-methyl-3α-acetoxy-18,20β-oxido-5β-pregnane-11-one, II, is described in copending commonly assigned U.S. patent application S.N. 80,558, filed January 4, 1961, now U.S. Patent No. 2,984,662. This patent produces Compound II by a selective reduction of the 20-carbonyl group of 3α-acetoxy-16α-methyl-5β-pregnane-11,20-dione and by transformation of the 3α-acetoxy-16α-methyl-5β-pregnane-20-ol-11-one so obtained into 16α-methyl-3α-acetoxy-18,20β-oxido-5β-pregnane-11-one, II.

The reduction of the carbonyl group in the 20 position is advantageously made by means of sodium borohydride while operating in ethanol. The transformation of the 20-hydroxy compound into the 18,20β-oxido compound is effected by means of lead tetraacetate while operating at elevated temperatures in benzene and in the presence of a source of white light.

A preferred mode of execution of the process of the invention can be characterized by the following steps:

(a) The reduction of the 11-ketone of Compound II with simultaneous saponification of the acetoxy group in the 3 position to give Compound III, is made advantageously by means of an alkali metal borohydride, such as potassium borohydride, while operating in an aqueous lower alkanol, such as ethanol, at temperatures up to and including the refluxing temperature.

(b) The selective oxidation of the hydroxyl group in the 3 position of Compound III is effected preferably by means of an aluminum lower alkanolate, such as aluminum isopropylate, in the presence of a ketonic solvent, such as cyclohexanone, and an inert hydrocarbon solvent, such as toluene, at distillation temperatures.

(c) The transposition of the 18,20β-oxido bridge of Compound IV into 11β,18 position, accompanied by esterification of the hydroxyl group in the 20β position, is effected advantageously by action of an organic carboxylic acid, such as formic acid at reflux temperatures.

(d) The bromination in the 4 position of Compound V is made advantageously by the action of a solution of bromine in a lower alkanoic acid, such as acetic acid, at about room temperature.

(e) The dehydrobromination of the 4ξ-bromo Compound VI is made preferably by the action of lithium bromide in an inert organic solvent, such as dimethylformamide, at distillation temperatures.

(f) The saponification of the 20β-formyloxy Compound VII is made advantageously by action of a lower alkanolic solution of an alkali metal hydroxide, such as an ethanolic solution of potassium hydroxide, at a temperature between about 0° C. and about room temperature.

(g) The oxidation of the 20-hydroxyl group of Compound VIII is effected preferably by means of a chromate oxidizing agent, such as chromic acid anhydride, in an acidic media, such as acetic acid, at about room temperature.

The following example is illustrative of the invention, without, however, limiting the same.

*Example.*—*Preparation of 16α-methyl-11β,18-oxido-Δ⁴-pregnene-3,20-dione, I*

STEP A.—PREPARATION OF 16α-METHYL-18,20β-OXIDO-5β-PREGNANE-3α,11β-DIOL, III 2 gm. of 16α-methyl-3α-acetoxy-18,20β-oxido-5β-pregnane-11-one, II, were dissolved in 16 cc. of hot ethanol and 4 cc. of hot water. Then two grams of potassium borohydride were added and the reaction mixture was heated to reflux for a period of about 4 hours. The mixture was next poured in 80 cc. of water. The residue was vacuum filtered and washed with water.

The raw product was dissolved in 500 cc. of methylene chloride. The solution was dried over magnesium sulfate, filtered and concentrated to 20 cc. The purified product crystallized. 1.307 gm. of 16α-methyl-18,20β-oxido-5β-pregnane-3α,11β-diol, III, were obtained having a melting point of 256° C. The product is very soluble in alcohol, soluble in acetone, slightly soluble in chloroform, and insoluble in ether.

*Analysis.*—$C_{22}H_{36}O_3$; molecular weight=348.51. Calculated: C, 75.81%; H, 10.41%. Found: C, 75.6%; H, 10.4%.

This compound is not described in the literature.

STEP B.—PREPARATION OF 16α-METHYL-18,20β-OXIDO-5β-PREGNANE-11β-OL-ONE, IV 1.2 gm. of 16α-methyl-18,20β-oxido-5β-pregnane-3α, 11β-diol, III, were placed in suspension in 60 cc. of toluene. Then 25 cc. of solvent were distilled off and a solution of 0.6 gm. of aluminum isopropylate in 24 cc. of toluene and 9.6 cc. of cyclohexanone were added over a period of 20 minutes while continuing the distillation. The distillation was continued another 20 minutes while maintaining the volume constant by the addition of toluene.

The reaction mixture was next cooled, added to ice and normal hydrochloric acid and the organic phase was separated. The organic phase was washed with water, with an aqueous solution of sodium bicarbonate and again with water. The aqueous phases were extracted with methylene chloride. The organic phases were combined, dried over magnesium sulfate and evaporated to dryness under vacuum. The residue was next taken up in petroleum ether from which 0.898 gm. of 16α-methyl-18,20β-oxido-5β-pregnane-11β-ol-3-one, IV, were made to crystallize. This product had a melting point of 208° C. Recrystallization could be effected from ether. The product is soluble in alcohol, acetone and chloroform, slightly soluble in ether, and insoluble in water.

*Analysis.*—$C_{22}H_{34}O_3$; molecular weight=346.49. Calculated: C, 76.26%; H, 9.89%. Found: C, 76.2%; H, 10.1%.

This compound is not described in the literature.

STEP C.—PREPARATION OF 16α-METHYL-20β-FORMYLOXY-11β,18-OXIDO-5β-PREGNANE-3-ONE, V 2.5 gm. of 16α-methyl-18β,20-oxido-5β-pregnane-11β-ol-3-one, IV, were introduced into 7.5 cc. of boiling formic acid. The reaction mixture was maintained at reflux for a period of about 10 minutes, then cooled, and added to water. The aqueous reaction mixture was extracted with methylene chloride and the organic layer was separated. The organic layer was next washed with water, with sodium bicarbonate and again with water, dried over magnesium sulfate and concentrated to a volume of about 5 cc. 60 cc. of petroleum ether were added and the solution was concentrated to a volume of about 15 cc. and then cooled to cause crystallization. The crystals obtained were vacuum filtered and dried at 100° C. 1.74 gm. of 16α-methyl-20β-formyloxy-11β,18-oxido-5β-pregnane-3-one, V, having a melting point of 174° C. were obtained. The product could be recrystallized from isopropyl ether. It is soluble in ether, acetone, and chloroform, and insoluble in water.

*Analysis.*—$C_{23}H_{34}O_4$; molecular weight=374.50. Calculated: C, 73.76%; H, 9.15%. Found: C, 73.6%; H, 9.1%.

This compound is not described in the literature.

STEP D.—PREPARATION OF 4ξ-BROMO-16α-METHYL-20β-FORMYLOXY-11β,18-OXIDO-5β-PREGNANE-3-ONE, VI 2.3 gm. of 16α-methyl-20β-formyloxy-11β,18-oxido-5β-pregnane-3-one, V, were dissolved in a mixture of 4.6 cc. of acetic acid and 0.1 cc. of a solution of 20% hydrobromic acid in acetic acid. Then 6 cc. of a solution of 17.9% bromine in acetic acid were added. At the end of the reaction, the reaction mixture was diluted with 40 cc. of methylene chloride. The solution obtained was washed with water, then with a solution of sodium bicarbonate, dried over magnesium sulfate, and the volume was reduced by distillation to 5 cc. 50 cc. of ether were added thereto and the solution was concentrated again to 15 cc. and allowed to crystallize. The crystals were vacuum filtered and dried, then taken up in 18 cc. of methylene chloride. 60 cc. of ether were added to the solution obtained and it was concentrated to 15 cc. and allowed to stand for crystallization. 1.48 gm. of 4ξ - bromo - 16α - methyl - 20β - formyloxy - 11β,18-oxido-5β-pregnane-3-one, VI, having a melting point of 230° C. were obtained. The product is soluble in chloroform and acetone, slightly soluble in ether and insoluble in water.

*Analysis.* — $C_{23}H_{33}O_4Br$; molecular weight = 453.41. Calculated: C, 60.92%; H, 7.34%; Br, 17.63%. Found: C, 60.4%; H, 7.4%; Br, 18.6%.

This compound is not described in the literature.

STEP E.—PREPARATION OF 16α-METHYL-20β-FORMYLOXY-11β,18-OXIDO-Δ⁴-PREGNENE-3-ONE, VII 0.700 gm. of lithium bromide were dissolved in 26 cc. of hot dimethylformamide. 5 cc. of solvent were distilled therefrom, then 1.4 gm. of 4ξ-bromo-16α-methyl-20β-formyloxy-11β,18-oxido-5β-pregnane-3-one, VI, were added and the distillation was continued for a period of about 20 minutes at a rate whereby about 14 cc. of distillate were obtained. The reaction mixture was next cooled and water was added. The precipitate was vacuum filtered, washed with water and dried.

The raw product was purified by recrystallization from ether. 0.773 gm. of 16α-methyl-20β-formyloxy-11β,18-oxido-Δ⁴-pregnene-3-one, VII, having a melting point of 202° C., were obtained. The product is very soluble in chloroform, soluble in alcohol and acetone, slightly soluble in ether and insoluble in water.

*Analysis.*—$C_{23}H_{32}O_4$; molecular weight=372.49. Calculated: C, 74.16%; H, 8.66%. Found: C, 74.2%; H, 8.8%.

This compound is not described in the literature.

STEP F.—PREPARATION OF 16α-METHYL-11β,18-OXIDO-Δ⁴-PREGNENE-20β-OL-3-ONE, VIII 0.650 gm. of 16α-methyl-20β-formyloxy-11β,18-oxido-Δ⁴-pregnene-3-one, VII, were placed in suspension in 1 cc. of ethanol at a temperature of about 10° C. and 2 cc. of normal alcoholic potassium hydroxide were added. The reaction was allowed to proceed for a period of about one and a half hours at a temperature of 10° C. Then, water was added thereto. The crystalline residue formed was vacuum filtered and the crystals were washed with water.

The raw product, so formed, was purified by recrystallization from ether. 0.335 gm. of 16α-methyl-11β,18-oxido-Δ⁴-pregnene-20β-ol-3-one, VIII, having a melting point of 172° C., were obtained. The product is soluble in acetone and chloroform, slightly soluble in ether, and insoluble in water.

This compound is not described in the literature.

STEP G.—PREPARATION OF 16α-METHYL-11β,18-OXIDO-Δ⁴-PREGNENE-3,20-DIONE, I 300 mg. of 16α-methyl-11β,18-oxido-Δ⁴-pregnene-20β-ol-3-one, VIII, were dissolved in 10 cc. of acetic acid and 100 mg. of chromic acid anhydride were added in small portions while agitating. After three hours, the reaction mixture was poured into water and extracted with methylene chloride. The extracts were washed with sodium bicarbonate and with water, dried over magnesium sulfate and distilled to dryness.

The raw product was taken up in petroleum ether and crystallized. It could be recrystallized from ether. The 16α-methyl-11β,18-oxido-Δ⁴-pregnene-3,20-dione, I, so obtained, had a melting point of 190° C. and a specific rotation $[\alpha]_D^{20}=+200°\pm10°$ (c.=0.25% in chloroform). The product is very soluble in alcohol and chloroform, soluble in acetone and ether, and insoluble in water.

*Analysis.*—$C_{22}H_{30}O_3$; molecular weight=342.46. Calculated: C, 77.15%; H, 8.83%. Found: C, 76.9%; H, 8.8%.

This compound is not described in the literature.

The preceding example is not to be construed as limiting the invention. Other equivalent techniques, such as varying the reaction times, the reaction temperatures, the solvents utilized, or the reactants employed, may be used without departing from the spirit of the invention or the scope of the appended claims.

We claim:
1. 16α-methyl-11β,18-oxido-Δ⁴-pregnene-3,20-dione having the formula:
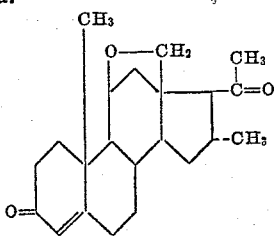
2. 16α - methyl - 20β - formyloxy - 11β,18 - oxido - Δ⁴-pregnene-3-one.
3. 16α-methyl-11β,18-oxido-Δ⁴-pregnene-20β-ol-3-one.
References Cited in the file of this patent
UNITED STATES PATENTS
2,989,522    Muller _____ June 20, 1961